March 12, 1940.  W. F. McGRAW  2,193,036
FLEXIBLE NOZZLE EXTENSION
Filed July 27, 1937
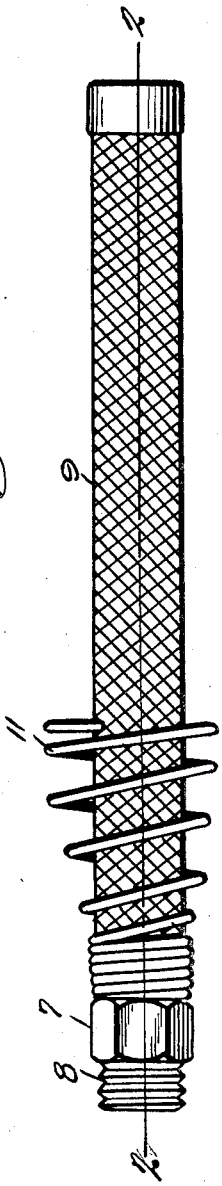
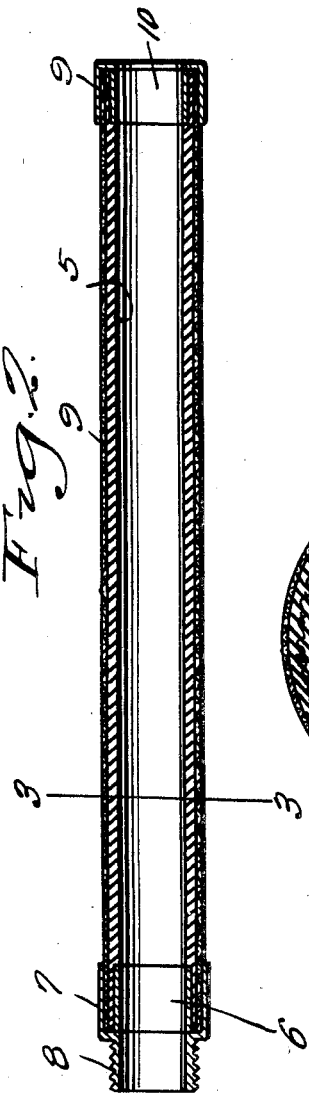
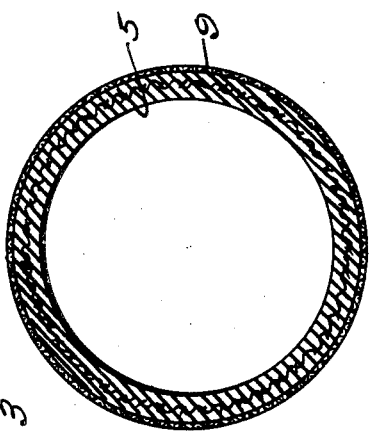
Inventor
W. F. McGraw
By Clarence A. O'Brien
Hyman Berman
Attorneys Patented Mar. 12, 1940

2,193,036

UNITED STATES PATENT OFFICE 2,193,036

FLEXIBLE NOZZLE EXTENSION

William F. McGraw, Detroit, Mich.

Application July 27, 1937, Serial No. 155,983

1 Claim. (Cl. 221—84)

This invention relates to new and useful improvements in nozzles and more particularly to a flexible nozzle extension especially adapted for use with gasoline pumps.

The principal object of the present invention is to provide a flexible nozzle extension which can be readily inserted into the gasoline tank of motor vehicles without inconvenience to the attendant.

Another important object of the invention is to provide a nozzle extension which will be durable and which will be electrically grounded against the occasion of sparks developing from static electricity.

Other important objects and advantages of the invention will become apparent to the reader of the following specification.

In the drawing—

Figure 1 represents a side elevational view.

Figure 2 is a longitudinal sectional view.

Figure 3 is an enlarged cross sectional view on the line 3—3 of Figure 2.

Referring to the drawing wherein like numerals designate like parts, it can be seen that numeral 5 represents a hose section, one end portion of which receives the band 6. This end portion of the hose 5 is insertable into the socket structure 7 of the threaded nipple 8 which is attachable to the usual nozzle at the end of the dispensing hose of a gasoline pump. (Not shown.)

The outside of the hose section 5 is provided with a metal sheathing or metal jacket of flexible braided material and this is denoted by numeral 9. This extends from one end of the hose section 5 to the other and also extends into the socket structure 7.

The band 6 is adapted to be expanded in the end of the hose section 5 so as to clamp the adjacent end of the hose 5 and jacket 9 against the inside of the socket structure 7 and many tools may be found suitable to perform this operation and which can be inserted through the nipple 8 and into the band 6.

A cap 9 is provided at the opposite end of the hose section 5 and a second band 10 is expanded in the hose section 5 to clamp this end of the hose section 5 and jacket 9 against the inside of the cap 9.

An anti-kinking spring 11 is provided on the coupling end of the nozzle structure as shown in Figure 1.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

A tubular structure for dispensing gasoline and the like, comprising an adapter for attaching the structure to a supply line, a flexible inner tube secured at one end to said adapter, a flexible metallic outer tubular sheath secured at one end to the structure adjacent to the adapter and extending to a position adjacent to the other end of the inner tube, and a mouth end element on said sheath.

WILLIAM F. McGRAW.